United States Patent [19]
Tsumura

[11] Patent Number: 5,117,301
[45] Date of Patent: May 26, 1992

[54] SYSTEM FOR TRANSMITTING INFORMATION TO MOVING OBJECT

[76] Inventor: Toshihiro Tsumura, 7-21 Abiko 3-chome, Sumiyoshi-ku, Osaka-shi, Osaka-fu, Japan

[21] Appl. No.: 545,998

[22] Filed: Jun. 28, 1990

[30] Foreign Application Priority Data

Jul. 3, 1989 [JP] Japan .................................. 1-171476

[51] Int. Cl.⁵ ........................................... H04B 10/00
[52] U.S. Cl. ................................... 359/154; 359/170
[58] Field of Search ..................... 455/604, 605, 603; 359/143, 152, 154, 169, 170; 340/991, 993

[56] References Cited

U.S. PATENT DOCUMENTS

| | | | |
|---|---|---|---|
| 3,675,989 | 7/1972 | Pietsch et al. | 455/605 |
| 3,697,941 | 10/1972 | Christ | 455/604 |
| 4,570,062 | 2/1986 | Tsumura | 455/605 |
| 4,823,138 | 4/1989 | Shibano et al. | 340/988 |
| 4,921,468 | 5/1990 | Miwa | 455/603 |

Primary Examiner—Edward L. Coles, Sr.
Assistant Examiner—Kinfe-Michael Negash
Attorney, Agent, or Firm—Darby & Darby

[57] ABSTRACT

A system for transmitting information to a moving object includes a light source disposed along a moving course for the moving object, an encoding device encoding the light beam emitted from the light source in accordance with a predetermined first signal allotted to the light source, a photodetecting device provided in the moving object, and a device for obtaining the first signal by decoding an output of the photodetecting device. The information typically includes positional data of the moving object. In departure from the case where the radio wave is employed in transmission, the system can operate with great reliability even when the light sources are closely arranged.

6 Claims, 10 Drawing Sheets

(a)

(b)

(c)

(d)

(e)

$V_{TH}$ (f)

(g)

SYSTEM FOR TRANSMITTING INFORMATION TO MOVING OBJECT

BACKGROUND OF THE INVENTION

1. Field of the Invention

The present invention relates to a system for transmitting information to a moving object, and more particularly, to a system for transmitting to a moving object information of, for example, positional data characteristic of each given position on the ground using a light beam.

2. Description of the Related Art

Recently, there is a growing tendency toward developing what is known as a car navigation system which automatically guides a car to a destination, or indicates to a driver the present position of the car or the direction to be taken. Roughly speaking, the car navigation system can be divided into two classes. The first one is a system similar to that referred to as a self-contained navigation system in the aircraft navigation, and the second one, which is also used in the aircraft navigation, is a system similar to that utilizing the navigation aid installation.

The self-contained navigation system is a system in which the present position is evaluated by monitoring the moving speed and direction all the time and integrating them. In the system utilizing the navigation aid installation, for example, one receives radio waves from a plurality of radars provided on the ground, and then calculates one's own position taking into consideration the positions of the aid installations and the condition of the received radio waves. In another system, one knows one's own positional information by telecommunication. In the car navigation system, the system by the navigation aid installations is employed, in many case, for correcting the positional information obtained by the self-contained navigation system.

The self-contained navigation system in the car navigation includes the following. In the first one, the moving speed of a car is evaluated by averaging the moving speeds of the right and left rear wheels of the car, and the change of the travel direction is evaluated by the difference of the travel distances of the right and left rear wheels for a unit time. The coordinates of the present position of the car with the origin at a predetermined position can be known by summing up the above-described values by a computer.

In the second system of the self-contained navigation, the travel distance of a car is evaluated in the same manner as that of the first system, and the travel direction of a car is measured by a magnetic compass mounted on the car. Furthermore, as the third system, it is possible to measure the travel direction of a car with a gyro scope mounted on the car. In this case, the travel distance of a car also can be obtained by summing up the speed.

The positional data evaluated by the above-described self-contained navigation system can be used in a system for automatically guiding a car to a destination. However, at the present time, the automatic guiding technique as described above has not been developed yet. The technique which has been put to practical use to some extent includes one in which the positional data evaluated by the above-described self-contained navigation system is displayed on a CRT (Cathode-Ray Tube).

Some types of methods of displaying positional information on a CRT are proposed. These proposed methods include a method of displaying a locus, the present position and the travel direction of a moving car on a CRT, a method of displaying the locus of a moving car on a CRT with a displayed map for its background, and a method in which a road map is displayed on a CRT using coordinate data concerning the road, and the locus of a moving car is corrected with the road coordinate data, thereby displaying the present position of a car which always corresponds to the road.

Assuming that all the devices operate without any error, the above-described self-contained navigation system can be an ideal system. However, it is impossible in practice. For example, it is impossible to measure the travel direction of a car without error, and it can not be avoided that the speed measurement includes some error. Accordingly, the positional data obtained by the self-contained navigation system must be corrected by some means. The navigation aid installations are used in such a case.

FIG. 1 is a schematic diagram showing a navigation aid system currently proposed. Referring to FIG. 1, beacon providing facilities A1, A2, A3 and A4 are provided at intersections a1, a2, a3 and a4 of a road 130, respectively. Each of the beacon providing facilities emits such a weak radio wave that it covers only the range shown in a circle at each of the intersections. The radio waves include information indicating positions of the respective intersections. Thus, a car 132, for example, can know its own position by receiving the radio wave from the beacon providing facility A3 when it enters the intersection a3.

By correcting the positional data by the self-contained navigation system using the above-described beacon providing facility, the positional data can be kept precise.

However, it is pointed out that the system for transmitting to a car its own positional information by the above-described beacon providing facility has problems as described below. First, it is pointed out that the information to be transmitted to a car easily picks up radio noise. Especially, in a city, for example, where a great number of cars run and repeatedly start and stop, the radio noise produced by the cars themselves is very large. A great amount of radio waves is flitting in the air these days as can be seen from the spread of car telephone. Besides, the respective beacons must be very weak so as not to "interfere" with adjacent beacons. Accordingly, the signals transmitted to a car by the respective beacons can easily pick up the radio noise.

Furthermore, there is a geographical limitation in positioning a beacon providing facility for avoiding unfavorable effect among adjacent beacons as described above. According to the conventional method, it is impossible to provide a large number of beacon providing facilities in a geographically complicated place, and only rough positional information can be transmitted.

SUMMARY OF THE INVENTION

Accordingly, one object of the present invention is to provide a system which can transmit positional information to a moving object more correctly.

Another object of the present invention is to provide a system which can transmit positional information to a moving object with smaller error.

Still another object of the present invention is to provide a system which can transmit more detailed positional information to a moving object.

According to the present invention, a system for transmitting information to a moving object includes: a light source for providing a light beam disposed at a point along a moving course for the moving object; an encoding device provided at the point where the light source is disposed for encoding the light beam in accordance with a predetermined first signal allotted to the point; a photodetecting device in the moving object positioned to detect the light beam provided by the light source when the light beam impinges upon the object for producing an electrical signal indicating the intensity of the light beam; and a decoding device provided in the moving object for decoding the first signal in response to the electrical signal. The information to be transmitted typically includes positional data of the moving object.

In the above-described system, the light beam emitted from the light source is encoded in accordance with the first signal allotted to the point where the light source is provided. When the moving object passes the path of the light beam, the photodetecting device outputs an electrical signal in response to the light beam. The electrical signal is decoded and the first signal is obtained. Once the first signal is obtained, the position of the light source which emitted the light beam is known.

There is a smaller possibility that the light beams will interfere with each other to produce noise as compared to radio waves. Also, the light beam has a smaller tendency to be affected by the radio noise in the vicinity. The light beam produces a smaller amount of radio noise by itself. Even when a number of light sources emitting modulated light beams are provided, their operations are kept normal. There is no unfavorable effect to the environment. The use of the light beam is not regulated by the law for regulating the use of electromagnetic wave, and it does not have the limitation of frequency assignment for preventing the interference. A number of light sources can be provided more closely than a conventional case. Thus, this system can transmit the positional information with smaller errors, or correctly, to a moving object.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
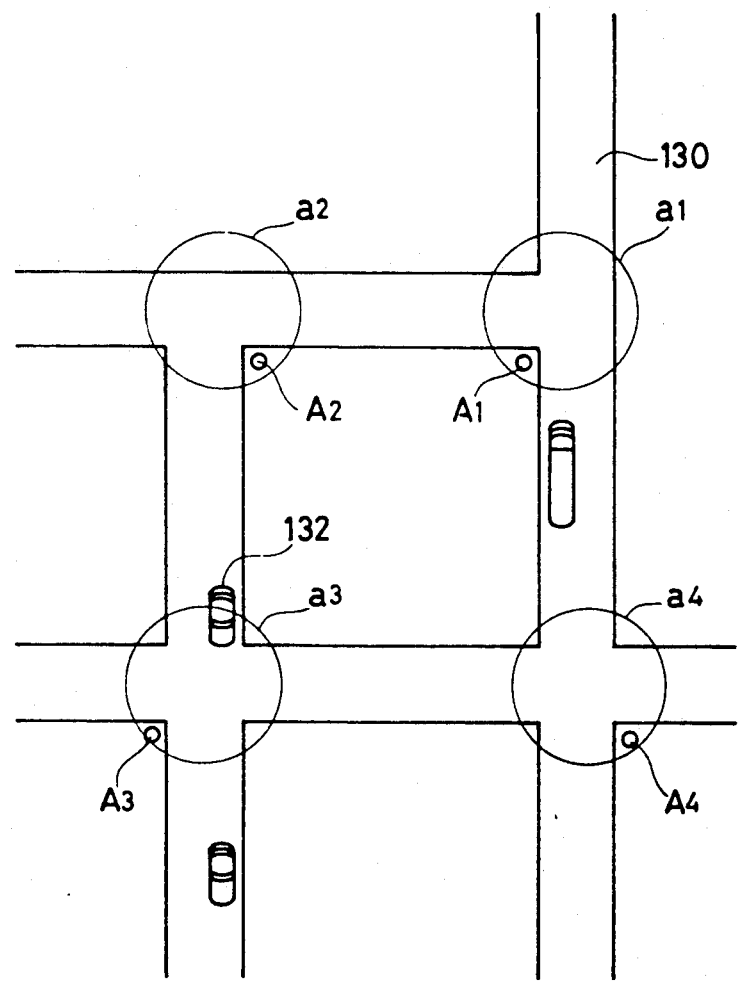
FIG. 1 is a schematic diagram showing the outline of a conventional system employing a beacon providing facility.
Figure 2:
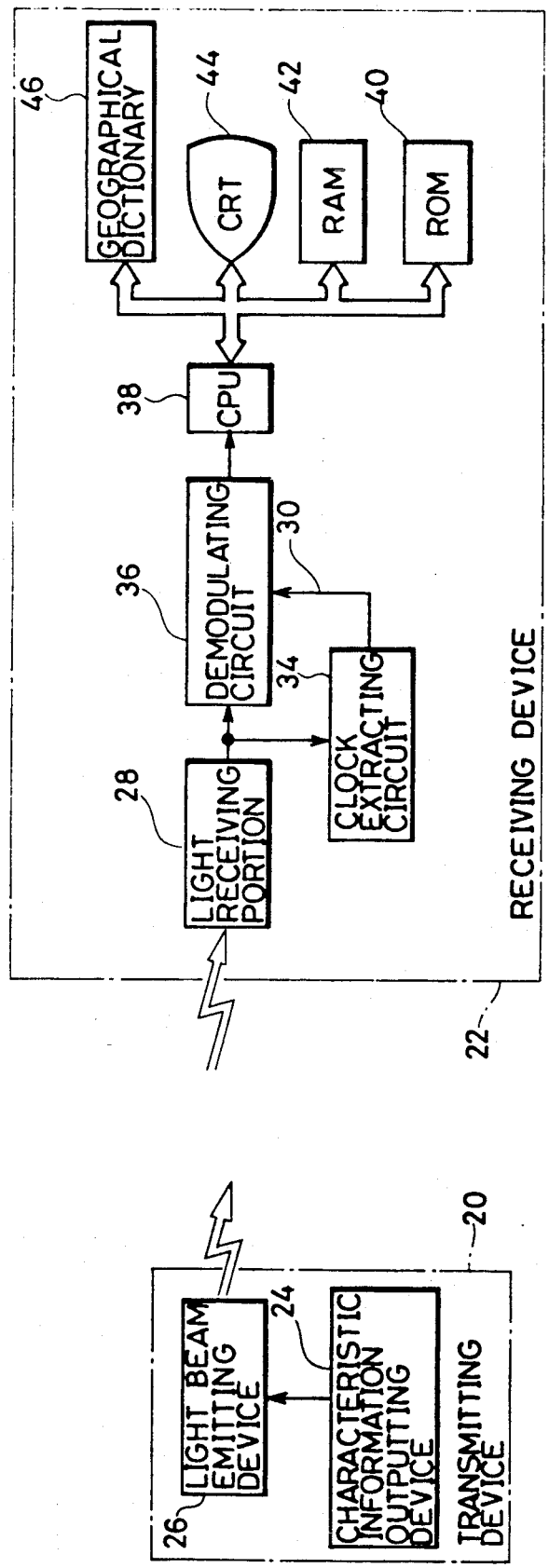
FIG. 2 is a block diagram showing a schematic structure of a positional information transmitting system for a moving object in accordance with a preferred embodiment of the present invention.

Referring to FIG. 2, an apparatus of a preferred embodiment of a system for transmitting positional information to a moving object in accordance with the present invention includes: a transmitting device 20 provided at a predetermined position on the ground for emitting a light beam to transmit an information signal characteristic of the position; and a receiving device 22 provided on a moving object such as a car, receiving the light beam emitted from the transmitting device 20, taking out the positional information included in the light beam, and for informing the driver of the same. The transmitting device 20 includes a characteristic information signal outputting device 24 for providing the information characteristic of the position where the transmitting device 20 is provided as a characteristic information signal, and a light beam emitting device 26 for emitting the light beam modulated by the characteristic information signal.

The receiving device 22 includes: a light receiving portion 28 receiving a light beam emitted by the transmitting device 20 for providing a photocurrent by photoelectric conversion; a clock extracting circuit 34 connected to the light receiving portion 28 for extracting a clock signal included in the photocurrent; a demodulating circuit 36 connected to the light receiving portion 28 and the clock extracting circuit 34 for demodulating a characteristic information signal from the photocurrent; a CPU (Central Processing Unit) 38 connected to the demodulating circuit 36 for performing a predetermined process on the basis of the characteristic information signal; a ROM (Read Only Memory) 40 connected to the CPU 38 and storing with a program performed in the CPU 38; a RAM (Random Access Memory) 42 connected to the CPU 38 to be used as a working area of the program; a geographical dictionary ROM 46 connected to the CPU 38 for looking up a city name with the characteristic information; and a CRT 44 connected to the CPU 48 for displaying a city name looked up from the geographical dictionary ROM 46 to present it to the driver. A clock signal 30 provided from the clock extracting circuit 34 is supplied to the demodulating circuit 36.

Figure 3:
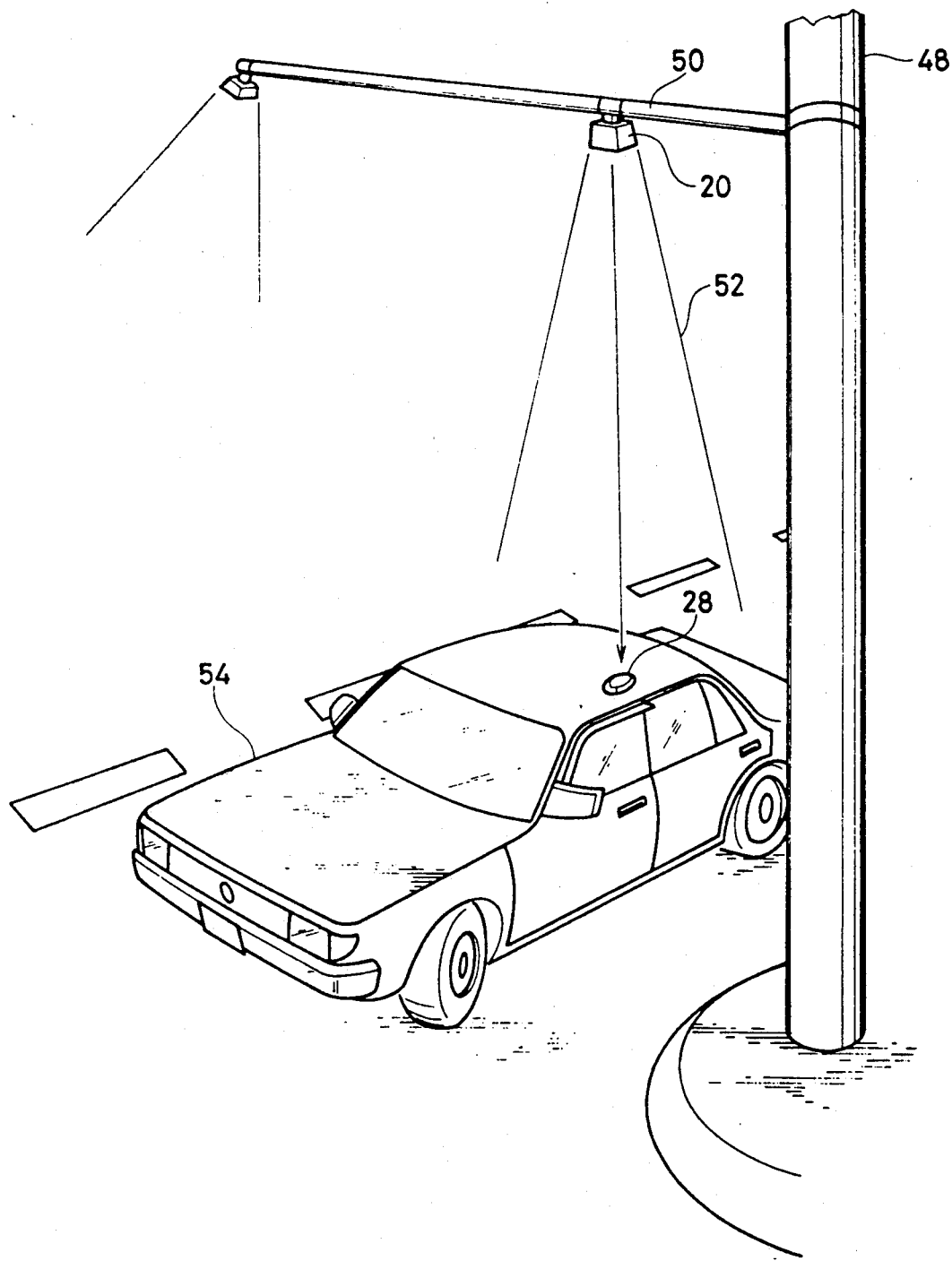
FIG. 3 is an illustration showing operation of a system of a preferred embodiment of the present invention.

Referring to FIG. 3, an arm 50 projecting over a road is attached to a pole 48 provided at a side portion of the road. At the bottom part of the arm 50 above the central portion of the road, a transmitting device 20 is provided facing downward. A light receiving portion 28 is provided on a roof of a car 54 running on the road. A light beam (fan beam) 52 whose width expands as the light beam advances is emitted from the transmitting device 20. Such an arrangement allows a portion of the light beam emitted from the transmitting device 20 to impinge on the light receiving portion 28.

Figure 4:
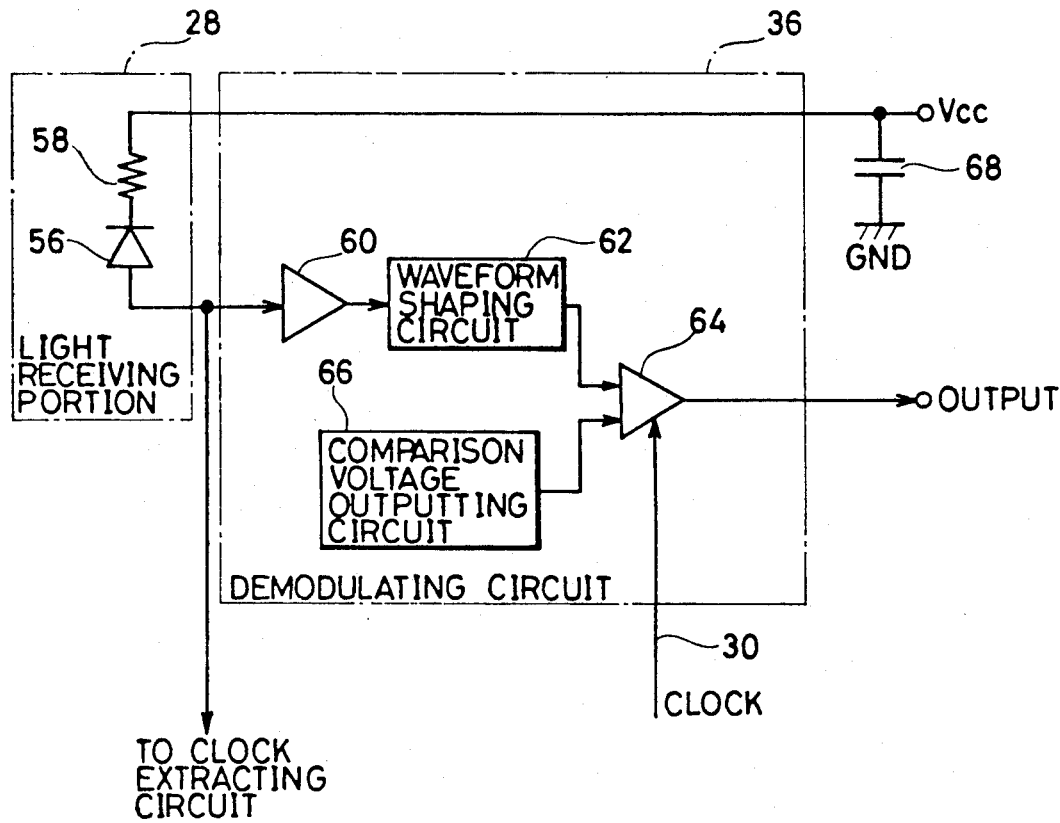
FIG. 4 is a more detailed block diagram of a demodulating circuit.

Referring to FIG. 4, the light receiving portion 28 includes a resistor 58 having its one end connected to a power supply Vcc and a photodiode 56 connected to the other end of the resistor 58 for receiving the light beam and providing photocurrent by photoelectric conversion. The power supply Vcc is connected to ground potential GND through a capacitor 68. The capacitor 68 is for removing noise components of the source current provided from the power supply Vcc.

The demodulating circuit 36 includes: an amplifier 60 connected to an output of the photodiode 56 for amplifying a photocurrent from the photodiode 56; a waveform shaping circuit 62 connected to an output of the amplifier 60 for shaping the waveform of the photocurrent to adapt it for the processing; a comparator 64 having one of its inputs connected to the waveform shaping circuit 62 for converting an output signal of the waveform shaping circuit 62 into a digital signal by comparing it with a predetermined reference voltage; and a comparison voltage outputting circuit 66 connected to the other input of the comparator 64 for providing the reference voltage for comparison. An output of the photodiode 56 branches out and is connected to a clock extracting circuit 34. A clock signal 30 from the clock extracting circuit 34 is provided to the comparator 64.

Referring to FIGS. 2-5, operation of this system will be described. FIG. 5(a) shows a waveform of a clock signal to be a reference of operation of the characteristic information signal outputting device 24. The device 24, synchronous to the clock signal shown in FIG. 5(a), generates a digital signal having such a waveform as shown in FIG. 5(b). The information expressed by this digital signal is "11011". The information characteristic of the transmitting device 20 is expressed as a characteristic information signal by providing a given number of such pulses continuously.

A light beam emitting device 26 emits a light beam having a waveform as shown in FIG. 5(c) in response to the characteristic information signal. In the waveform diagram shown in FIG. 5(c), the line portions indicate that only a very weak beam is emitted and the portions having given width indicate that a light beam with given intensity is emitted.

This light beam impinges on the light receiving portion 28 of the receiving device 22 and is converted into a photocurrent having a waveform as shown in FIG. 5(d) by the photoelectric conversion effect of the light receiving portion 28. The photocurrent is an analog signal with amplitude changing in response to the respective pulses of a characteristic information signal shown by the waveform diagram of FIG. 5(b). The photocurrent partly branches out to be sent to the clock extracting circuit 34. The clock extracting circuit 34 extracts and waveform-shapes a repetitive component included in the photocurrent to provide it as a clock signal 30. The waveform of the clock signal 30 becomes as shown in FIG. 5(f).

The photocurrent is also supplied to the demodulating circuit 36. The photocurrent supplied to the demodulating circuit 36 is amplified by the amplifier 60, and its waveform is shaped by the waveform shaping circuit 62. The photocurrent, for the convenience of later conversion into a digital signal, is converted into a signal having such a waveform as shown in FIG. 5(e) with emphasized amplitude.

The comparison voltage outputting circuit 66 provides the reference voltage (threshold voltage $V_{TH}$ for digitizing a photocurrent. The comparator 64 samples the voltage of the shaped photocurrent in response to the clock signal 30 with timing defined by each of the pulses of the clock signal 30 and compares it with the reference voltage $V_{TH}$. The comparator 64 outputs one pulse when the photocurrent value at the point of sampling is larger than the reference voltage $V_{TH}$, and outputs nothing when it is smaller. As a result, an output signal having a waveform shown in FIG. 5(g) can be obtained. The output signal becomes a restored characteristic information signal having the waveform shown in FIG. 5(b).

The restored characteristic signal is supplied to the CPU 38 through an interface not shown. The CPU 38, performing a program stored in the ROM 40, searches the geographical dictionary ROM 46 in accordance with the supplied characteristic information signal to retrieve a corresponding information. The retrieved information may be, for example, displayed as textual data such as a city name on a screen of the CRT 44, or the obtained information may be expressed as a sign visually indicating a correct point superposed on geographical data such as a map on the CRT 44. Of course, the characteristic information inputted to the CPU 38 can be utilized for correcting the positional data of a moving object obtained by the self-contained navigation system.

As described above, in accordance with the system of the preferred embodiment, it is possible to easily recognize, on a moving object such as a car, its own position, and also to precisely correct the data obtained by the self-contained navigation system. Accordingly, an automatic car guiding system or the like can be easily implemented by utilizing this system.

Figure 6:
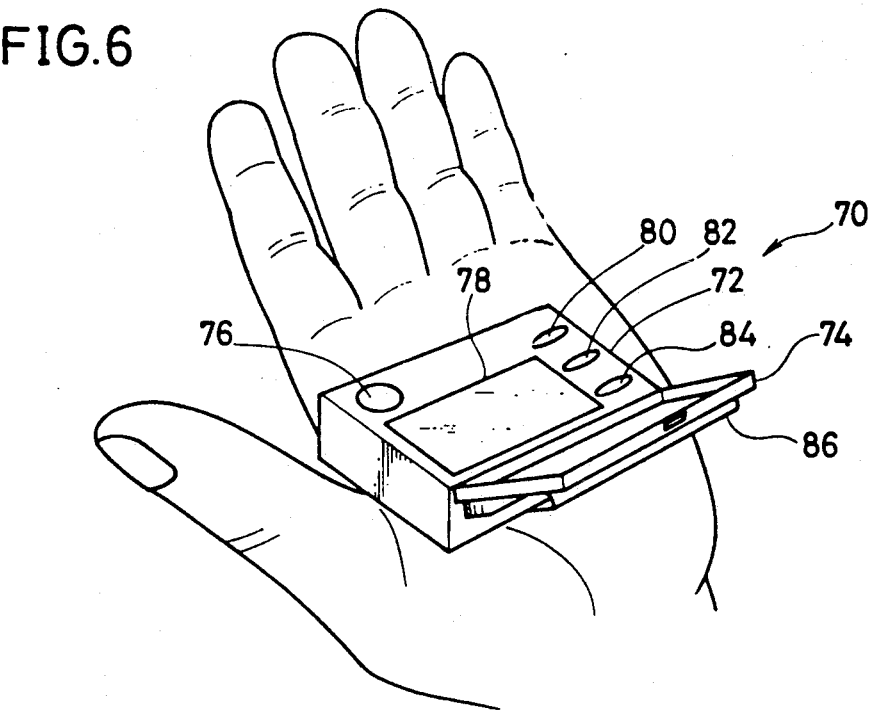
FIG. 6 is a perspective view of a pedometer employed in another preferred embodiment of the present invention.
Figure 5:
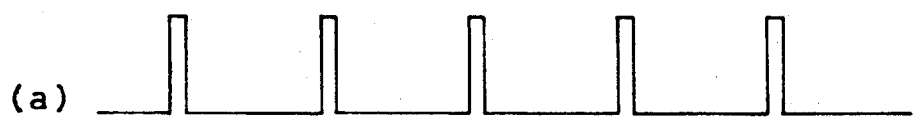
FIG. 5 is a waveform diagram showing modulation and demodulation of a characteristic information signal.
Figure 5:
Figure 5:
Figure 5:
Figure 5:
Figure 5:
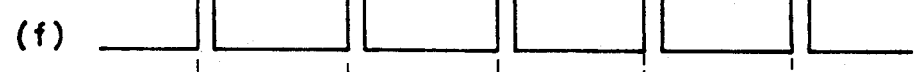
Figure 5:

FIG. 6 shows another example of a preferred embodiment of the system. In FIG. 6, a pedometer in which a portion of the system of the present invention is incorporated is shown. Referring to FIG. 6, this pedometer 70 includes: a main body 72 having a pace counting means measuring the number of steps by detecting the acceleration in the up and down directions as a man walks, a magnetic compass for specifying the travel direction of the man, a microcomputer for calculating the man's position, in a self-contained manner, by processing the data provided from the pace counting means and the magnetic compass, or the like; a lid 74 having metal fittings 86 for attaching the pedometer to a belt or the like; a light receiving portion 76 provided on the main body 72 receiving the light beam from the outside to output a photocurrent; a liquid crystal display panel 78 for displaying data concerning the point obtained by the signal received in the light receiving portion 76; a mode selecting switch 80 for selecting various functions of the pedometer 70; and a first input switch 82 and a second input switch 84, for example, for inputting fundamental data required for independently calculating a position.

Referring to FIG. 6, operation of this pedometer 70 will be described. The pace counting means calculates the number of steps of a man by measuring the acceleration in the up and down directions as a man walks. The magnetic compass finds out an azimuth with the earth magnetism, and measures the difference between the azimuth and the man's travel direction. The microcomputer calculates the man's present position from the measured travel direction and number of steps. In this case, the average stride of a man using this pedometer 70 has been previously inputted using the input switches 82 and 84. The measured number of steps and the travel distance yielded by multiplying it by the stride are usually displayed on the liquid crystal display panel 78. However, by operating the mode selecting switch 80, the independently measured current position, for example, is displayed as coordinates having its origin at a given position. Also, by previously inputting the fundamental data such as the weight of a man using the pedometer employing the input switches 82 and 84, a calorific value or the like consumed as he walks can be displayed.

The characteristic data from the transmitting device 20 in the first preferred embodiment is transmitted to this pedometer 70 by locating the light receiving portion 76 in the light beam when it comes to the point at which the transmitting device 20 is provided. The microcomputer included in the pedometer 70 displays the information concerning that point on the liquid crystal display panel 78 on the basis of the characteristic information transmitted by the transmitting device 20. The microcomputer also corrects the independently measured positional data with the transmitted characteristic information.

In this case, a possible configuration is that a geographical dictionary or the like is prepared in the pedometer 70 and that textual data such as a code characteristic of the transmitting device is transmitted from the transmitting device. The microcomputer refers the geographical dictionary on the basis of the transmitted code information and displays a city name. Otherwise, textual data indicating a city name may be transmitted from the transmitting device 20 together with the code indicating that point without preparing a geographical dictionary in the pedometer 70. In this case, the microcomputer displays the transmitted city name data on the liquid crystal display panel 78 without processing the same.

By employing such a pedometer, one can recognize his/her position precisely even when he/she is in an unknown place. The time period required for arriving at one's destination will be saved. There is little possibility to lose one's way. As one can precisely express his/her present position even in an entirely unknown place, it is very convenient when he/she tries to inform others of his/her position by telephone. Possible systems also include one in which the transmitted characteristic information is temporarily stored in an inside memory, and when the system is connected to an outside device, the system prints out the traveled locus and present position superposed on a map.

Figure 7:
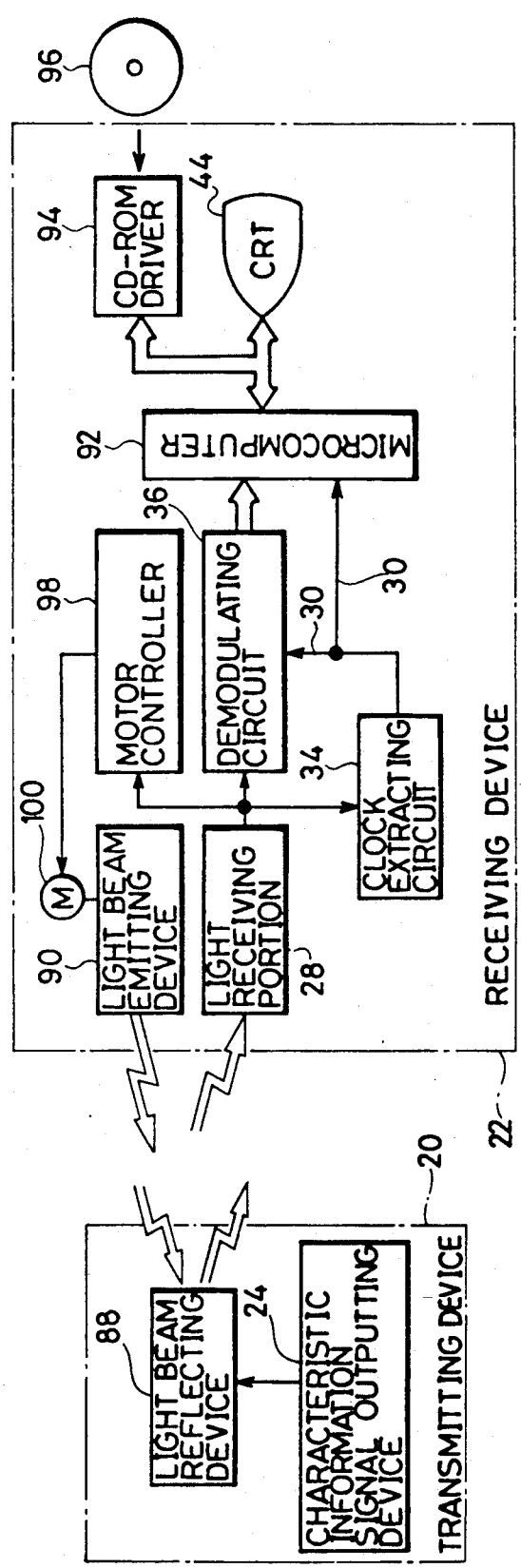
FIG. 7 is a block diagram showing a schematic structure of still another preferred embodiment of the present invention.

FIG. 7 is a block diagram showing a schematic structure of a system for transmitting positional information to a moving object in still another preferred embodiment of the present invention. Referring to FIG. 7, this system includes a transmitting device 20 provided at a given position on the ground for transmitting information characteristic of that position by a light beam to the moving object, and a receiving device 22 receiving the light beam from the transmitting device 20 to restore and utilize the information characteristic of the position of the transmitting device 20.

The transmitting device 20 includes a characteristic information signal outputting device 24 for outputting the information characteristic of that position as a characteristic information signal, and a light beam reflecting device 88 responsive to the characteristic information signal, modulating the light beam directed from the outside, and reflecting the light beam in the same direction as the direction of incidence regardless of its direction of incidence.

The receiving device 22 includes a light beam emitting device 90 for emitting a light beam toward the transmitting device 20, and a light receiving portion 28 for receiving the light beam emitted by the light beam emitting device 90 and reflected and modulated by the device 88 to output a photocurrent. The receiving device 22 further includes a clock extracting circuit 34 connected to the light receiving portion 28 for extracting a clock signal included in the photocurrent, a motor controller 98 connected to the light receiving portion 28 for controlling the emission direction of the light beam of the light beam emitting device 90 in response to the magnitude of the photocurrent, and a motor 100 connected to the motor controller 98. The motor 100 is for changing the direction of the light beam emitting device 90.

The receiving device 22 further includes a demodulating circuit 36 connected to the light receiving portion 28 and the clock extracting circuit 34 for demodulating a characteristic information signal from the photocurrent, a microcomputer 92 connected to the demodulating circuit 36 through an interface not shown for performing a predetermined process to the characteristic information signal, a CRT 44 for displaying the data processed by the microcomputer 92, and a CD-ROM driver 94 provided with a CD (Compact Disc)-ROM 96 stored with data such as a geographical dictionary and a map for driving the same to read out the data.

Referring to FIG. 7, this system operates as in the following. The light beam emitting device 90 emits a light beam in a random direction. This light beam is not modulated at all. The light beam reflecting device 88 includes a corner cube, for example. The corner cube is characterized in that it reflects an incident light beam in the same direction regardless of its direction of incidence. When the light beam emitted from the light beam emitting device 90 impinges upon the light beam reflecting device 88, the light beam is reflected in the same direction as the direction of incidence. At the same time, the reflected beam is modulated according to a characteristic information signal. The modulated light beam goes back in the direction to the light beam emitting device 90 and enters the light receiving portion 28.

The light receiving portion 28 performs photoelectric conversion to the incident light beam and outputs a photocurrent. The photocurrent is supplied to the motor controller 98. The motor controller 98 controls the emission direction of the light beam of the light beam emitting device 90 to keep the condition of the photocurrent preferable. The motor 100 changes the direction of the light beam emitting device 90 with an instruction of the motor controller 98.

The photocurrent provided from the light receiving portion 28 is also supplied to the clock extracting circuit 34. The clock extracting circuit 34 extracts repetitive components included in the photocurrent to output it as a clock signal 30. The demodulating circuit 36 demodulates the characteristic information signal in response to the photocurrent and the clock signal 30. This method of modulating is the same as that described in the first preferred embodiment.

The demodulated characteristic information signal is supplied to the microcomputer 92. The microcomputer 92 processes the characteristic information signal and displays the present position of the receiving device 22 on the CRT 44, or displays the present position by superposing the same upon a map read out from the CD-ROM driver 94, for example. Furthermore, the data processed by the microcomputer 92 may be sent to a system for the self-contained navigation to be used for correcting the present position.

In the above-described preferred embodiment, a light beam emitting device 90 is provided on the receiving device side and the emission direction of the light beam of the light beam emitting device 90 is controlled so that it is kept facing toward the light beam emitting device 88. Accordingly, it has an advantage that it can transmit a certain amount of data. Furthermore, its structure can be simple because it has no light beam generating device on the side of the transmitting device 20. Besides, the device 88 can simultaneously deal with the incidence of a light beam from a plurality of receiving devices. Therefore, it is effective to provide a transmitting device 20 at a place having a large volume of traffic or at a place such as a speed way where cars move at high speed.

Figure 8:
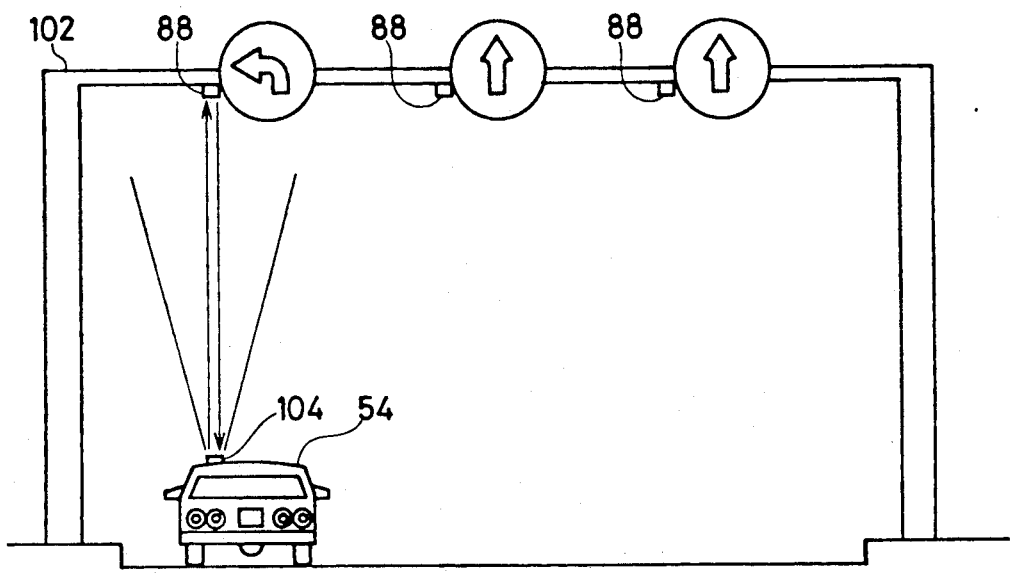
FIG. 8 is a schematic diagram showing operation of a preferred embodiment of the present invention.

FIG. 8 is a schematic diagram showing one example of arranging a transmitting device of this preferred embodiment. Referring to FIG. 8, the light beam reflecting device 88 is provided facing downward at an arm portion of a traffic sign pole 102 provided on a road. A navigator antenna 104 including a light beam emitting device, a light receiving portion or the like is provided on a roof of a car 54 running under the device 88.

A light beam is emitted toward the light beam reflecting device 88 from the navigator antenna 104. The light beam reflecting device 88, while reflecting the incident light beam in the same direction as the direction of incidence, modulates the light beam according to the characteristic information. The modulated light beam impinges on the navigator antenna 104 and is converted into a photocurrent by the light receiving portion. The light beam emitted from the navigator antenna 104 is controlled to be directed toward the light beam reflecting device 88. Thus, a large amount of data can be transmitted with stability even if the car 54 is running at high speed.

As described in the above respective embodiments, when employing light for transmitting characteristic information, there are advantages as in the following. First, it can be pointed out that the law for regulating the use of electromagnetic wave is not applied to the light. Accordingly, complicated procedures such as the frequency assignment are not required. There is an advantage that the contents of the transmitted data is stable because interference among adjacent transmitting devices is not considerable. Furthermore, noise due to the radio waves in the vicinity is hardly caused in the information transmission by the light beam. For example, information can be transmitted in a good condition even when a large-sized truck or a bus is running in parallel.

Figure 9:
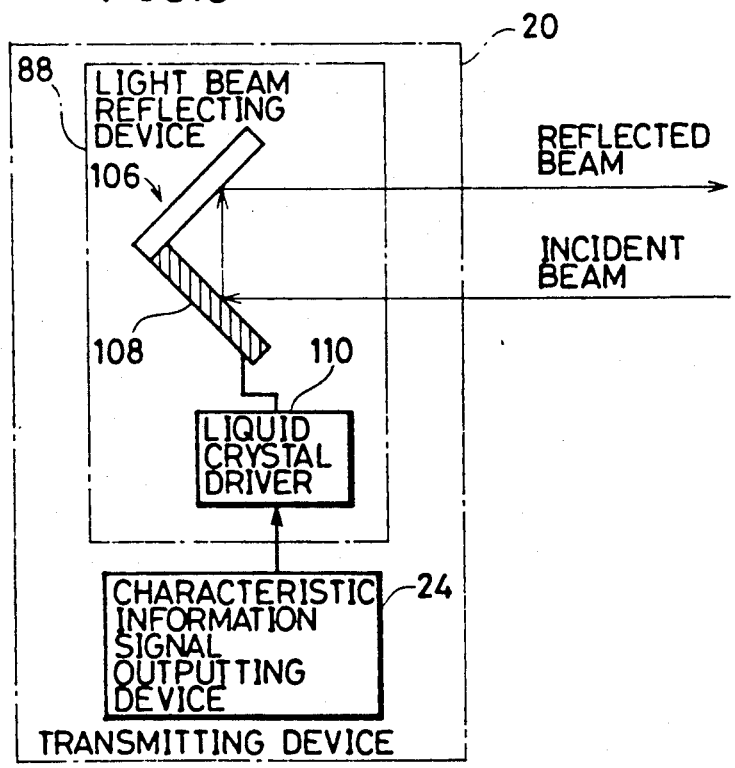
FIG. 9 is a block diagram showing one example of a transmitting device employed in the system according to the present invention.
Figure 10:
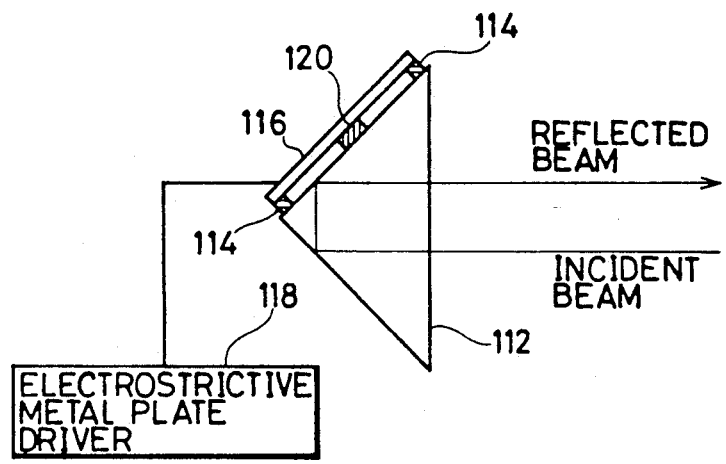
FIGS. 10 and 11 are schematic diagrams of a light beam reflecting means for modulating a light beam using an electrostrictive plate.
Figure 11:
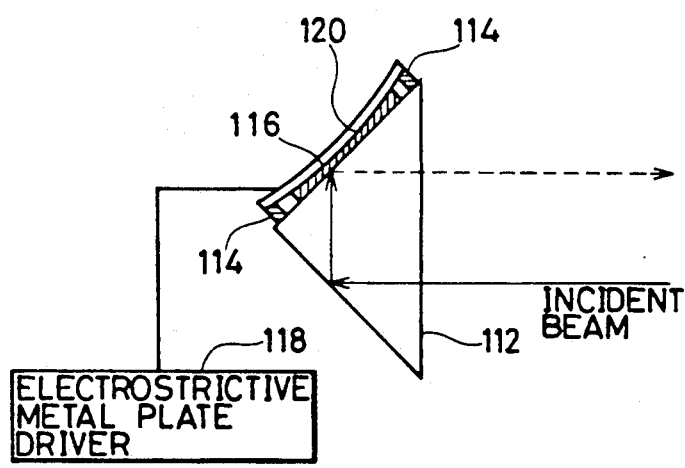

FIGS. 9-11 show examples of a light beam reflecting device 88 as described in the preferred embodiment of FIG. 7, for modulating the light beam while reflecting the light beam using a corner cube. Referring to FIG. 9, the transmitting device 20 includes a characteristic information signal outputting device 24 and a light beam reflecting device 88 connected to the device 24. The light beam reflecting device 88 includes a corner cube 106, a liquid crystal shutter 108 provided on one of the reflecting surfaces of the corner cube 106, and a liquid crystal driver 110 connected to the characteristic information signal outputting device 24 and the liquid crystal shutter 108 for driving the liquid crystal shutter 108 in response to a characteristic information signal.

The liquid crystal driver 110, in response to the characteristic information signal supplied from the characteristic information signal outputting device 24, drives the liquid crystal shutter 108 and controls the light beam reflection on the reflecting surface where the liquid crystal shutter 108 is provided.

For example, when the characteristic information signal is "High", the liquid crystal driver 110 drives the liquid crystal shutter 108 to make the light beam reflected on the surface. When the characteristic information signal is "Low", the liquid crystal driver 110 drives the liquid crystal shutter 108 so that the incident light on the surface is not reflected. Accordingly, the light beam impinging upon the corner cube 106 is modulated by changing the condition of the liquid crystal shutter 108 in response to a characteristic information signal. The waveform of the obtained light beam is shown in FIG. 5(c).

FIGS. 10 and 11 show a modulation method employing no liquid crystal shutter. Referring to FIG. 10, this light beam reflecting device includes a corner cube prism 112 for reflecting the incident light in the same direction regardless of its direction of incidence, an electrostrictive metal plate (a metal plate with its shape changing according to an applied voltage) 116 provided on one of the total-reflecting surfaces of the corner cube prism 112 facing this total-reflecting surface through a fine gap by a sealing member 114, an electrostrictive metal plate driver 118 for driving the electrostrictive metal plate 116, and a sealed liquid 120 sealed between the electrostrictive metal plate 116 and the total-reflecting surface. The surface of the electrostrictive metal plate 116 on the corner cube prism 112 side does not reflect the light.

As the electrostrictive metal plate driver 118 applies a given voltage to the electrostrictive metal plate 116, the electrostrictive metal plate 116 bends toward the corner cube prism 112 as shown in FIG. 11. The sealed liquid 120 spreads in a lateral direction in the gap as the width of the gap narrows. The incident light on the corner cube prism 112 is not reflected on the total-reflecting surface on which the electrostrictive metal plate 116 is provided, passes through the sealed liquid 120, reaches the electrostrictive metal plate 116, and is absorbed therein. Accordingly, no beam is emitted from the corner cube prism 112.

On the other hand, in case where the electrostrictive metal plate 116 is not bent as shown in FIG. 10, the light beam incident on the corner cube prism 112 is also reflected on the surface on which the electrostrictive metal plate 116 is provided so that it goes back in the same direction as that of the incident beam as a reflected beam. Accordingly, by switching the condition shown in FIG. 10 and the condition shown in FIG. 11 according to a characteristic information signal, the light beam incident on the corner cube prism 112 can be modulated.

Figure 12:
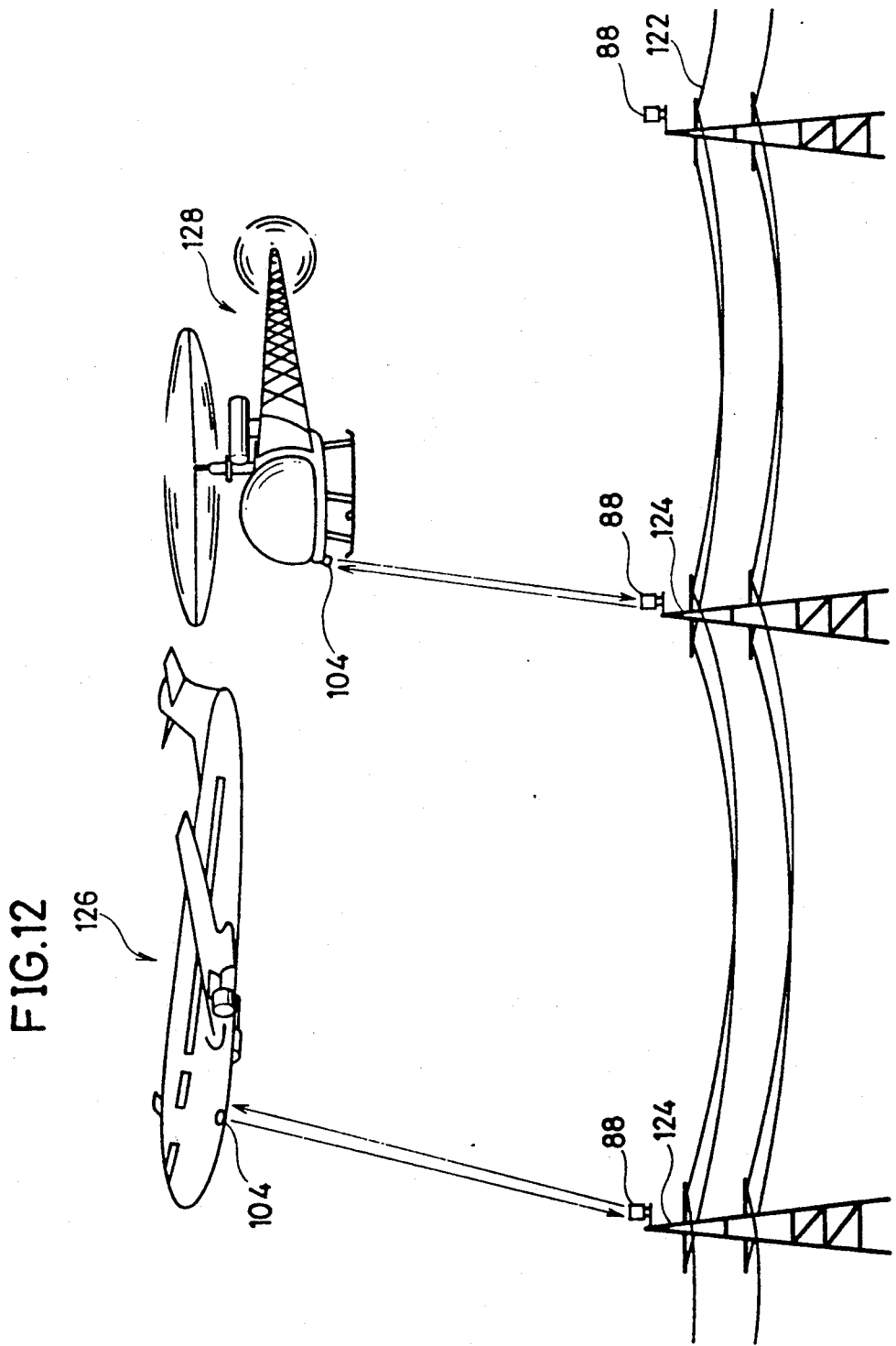
FIG. 12 is a diagram schematically showing a principle of the airplane navigation aid using the present system.

In the above-described preferred embodiments, a system for transmitting positional information to a moving object according to the present invention is applied to a moving object on the ground such as a car. However, the present invention is not limited thereto. For example, referring to FIG. 12, the system can be employed as a navigation aid installation for aircrafts such as an airplane 126 and a helicopter 128 by providing a light beam reflecting device 88 on a steel tower 124 for suspending a transmission line 122. A navigator antenna 104 is provided on the bottom surface of the airplane 126 or the helicopter 128. In this system, the data required for navigation can be obtained by emitting a light beam to the light beam reflecting device 88 and receiving the reflected light beam.

In the above-described embodiments, the transmitted information is the positional data of the moving object. The invention, however, is not limited thereto. The information may include commercial information such as the location of next gas stations, nearby supermarkets, movie theaters or parking lots.

The invention is also applicable to the developing road-to-vehicle communication systems. Such systems include a road information broadcasting system as shown in FIG. 13.

Figure 13:
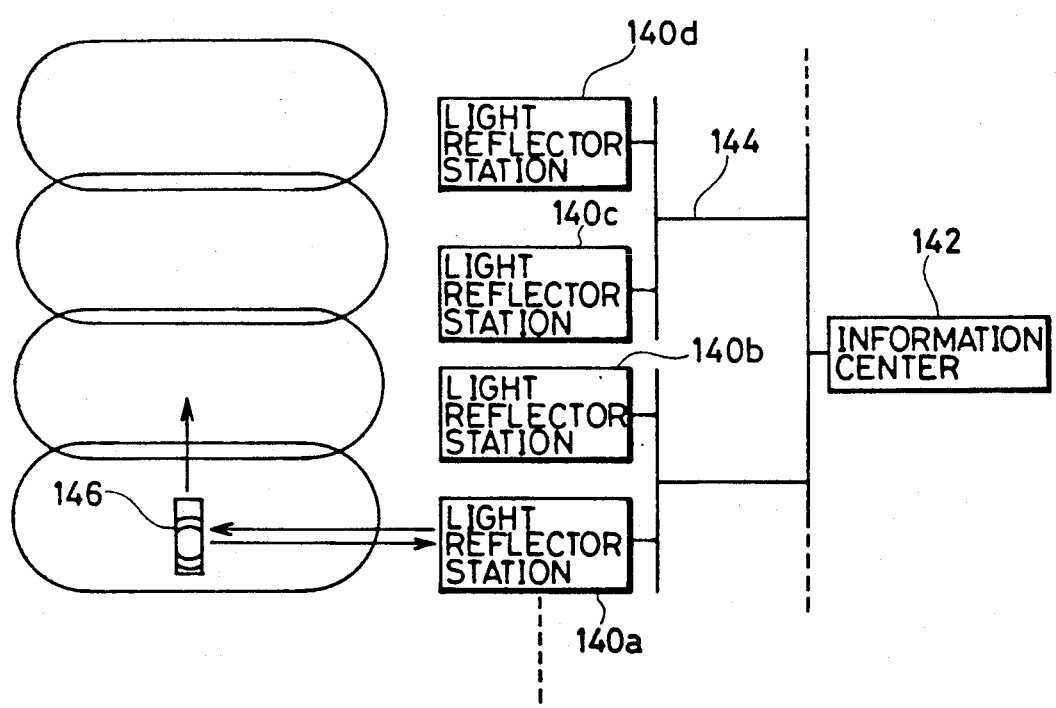
FIG. 13 is a schematic diagram of a network of central station and corner cube stations.

Referring to FIG. 13, the system includes an information center 142 and a plurality of light reflector stations 140a to 140d located along the path for a car 146, each connected to the information center 142 via the network 144. The stations 140a to 140d are each provided with a corner cube and a modulation circuit. On the car 146, a beam emitter and a beam receiver such as a navigator antenna are mounted.

The center 142 provides the stations 140a to 140d with road information, weather information or the like. When a light beam is directed from the car 146 toward the station 140a, the light beam is modulated by the road information, weather information or the like and is reflected back along its path of incidence.

The car-mounted beam receiver receives the reflected light beam and obtains the necessary information by demodulating the received light beam. The information is presented by means of a CRT or the like. Thus, the driver can avoid a congested street or a flooded road.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self contained navigation system for a moving vehicle comprising:
   means in said vehicle for emitting a light beam;
   means located along the course of travel of the vehicle for reflecting back to the vehicle the light beam emitted, said reflecting means including a light beam reflector and means for modulating the reflected light beam with a characteristic signal representative of a location of said reflecting means;
   light receiving means on the vehicle for receiving the modulated reflected light beam;
   means for extracting from said modulated reflected light beam identification information that is indicative of said location from which the reflected beam originates; and
   means including a microprocessor connected to said extracting means for processing said identification information.

2. A self contained navigation system in accordance with claim 1, wherein said reflector means includes a reflecting surface disposed in a path incident of said light beam emitted from said vehicle, and
   said modulating means comprises reflection controlling means for controlling the reflectivity of said reflecting surface in accordance with an encoding signal to modulate
   a light beam incident upon said reflecting surface in accordance with said encoding signal.

3. A self contained navigation system in accordance with claim 2, wherein said reflection controlling means includes a liquid crystal shuttering means disposed on said reflecting surface.

4. A self contained navigation system in accordance with claim 2, wherein said reflector includes a prism means having said reflecting surface,
   said reflector surface faces toward the inside of said prism.

5. A self contained navigation system in accordance with claim 4, wherein said reflection controlling means comprises space defining means provided adjacent to said reflecting surface from the side opposite to the path of incidence, with a predetermined spacing between said reflecting surface and said space defining means to define a space, a liquid sealed in said space, and a spacing controlling means responsive to said encoding signal for controlling said spacing between said reflecting surface and said space defining means, whereby said liquid comes in contact with said reflecting surface at different areas.

6. A self contained navigation system in accordance with claim 5, wherein
   said space defining means comprises an electrostrictive plate which bends toward said reflecting surface when provided with a voltage.

* * * * *